US008412153B2

(12) United States Patent (10) Patent No.: US 8,412,153 B2
Kauranen (45) Date of Patent: Apr. 2, 2013

(54) DATA VOLUME REPORTING FOR MULTIMEDIA BROADCAST/MULTIMEDIA SERVICE GROUPS

(75) Inventor: Kari Kauranen, Helsinki (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1126 days.

(21) Appl. No.: 11/656,644

(22) Filed: Jan. 23, 2007

(65) Prior Publication Data

US 2008/0163309 A1    Jul. 3, 2008

(30) Foreign Application Priority Data

Dec. 28, 2006    (FI) .................................... 20065859

(51) Int. Cl.
*H04M 11/00*    (2006.01)
*H04M 3/42*    (2006.01)
*H04J 3/26*    (2006.01)

(52) U.S. Cl. ...................... 455/406; 455/414.1; 370/432

(58) Field of Classification Search ............... 455/414.1, 455/406; 370/432
See application file for complete search history.

(56) References Cited

U.S. PATENT DOCUMENTS

2003/0194997 A1* 10/2003 Huomo ...................... 455/432.1
2005/0141538 A1*  6/2005 Beckmann et al. ............ 370/432

FOREIGN PATENT DOCUMENTS

WO    WO 2004036843 A1 *    4/2004

OTHER PUBLICATIONS

3GPP TS123 125 V6.8.0: "Universal Mobile Telecommunications System (UMTS); Overall high level functionality and architecture impacts of flow based charging; Stage 2", Mar. 2006.*
3GPP TS 25.413, V7.4.0 (Dec. 2006), "$3^{rd}$ Generation Partnership Project; Technical Specification Group Radio Access Network; UTRAN Iu interface RANAP signaling (Release 7)", 342 pgs.
3GPP TS 32.200, V5.9.0 (Sep. 2005), "$3^{rd}$ Generation Partnership Project; Technical Specification Group Services and System Aspects; Telecommunication management; Charging management; charging principles (Release 5)", 89 pgs.
3GPP TS 23.246, V7.1.1 (Dec. 2006), "$3^{rd}$ Generation Partnership Project; Technical Specification Group Services and System Aspects; Multimedia Broadcast/Multicast Service (MBMS); Architecture and functional description (Release 7)", 53 pgs.

* cited by examiner

*Primary Examiner* — Jinsong Hu
*Assistant Examiner* — Opiribo Georgewill
(74) *Attorney, Agent, or Firm* — Harrington & Smith

(57) ABSTRACT

Multicast/broadcast messaging service (MBMS) arrangement, in which a broadcast/multicast service center delivers multimedia messages to a plurality of users via a gateway GPRS support node (GGSN) and via a serving GPRS support node (SGSN) and a radio access network (RAN), in association with a given temporary mobile group identity (TMGI) and using a single radio access bearer (RAB). Responsive to a given event, the SGSN sends to the RAN a data volume report query identifying said RAB by the TMGI or another unique parameter. The RAN responds with a data volume report that indicates the amount of unsent MBMS data. If so agreed, the SGSN will pass said amount to a charging gateway for compensation in charging for the MBMS service.

13 Claims, 3 Drawing Sheets ns 11, only one packet data protocol (PDP) context is established as a prerequisite for a packet data transmission connection 17 between a GGSN 15 and a mobile station 11

DATA VOLUME REPORTING FOR MULTIMEDIA BROADCAST/MULTIMEDIA SERVICE GROUPS

TECHNICAL FIELD OF THE INVENTION

The present invention generally relates to digital wireless communications systems and devices. The invention relates particularly, though not exclusively, to the operation of a Multimedia Broadcast/Multimedia Service (MBMS).

DESCRIPTION OF RELATED ART

MBMS is a modern unidirectional Point-to-Multipoint multicast/broadcast service in which data is transmitted from a single source entity to a group of users in a specific area. A detailed description of MBMS architecture and functional description is provided in a document: 3GPP TS 23.246, V.7.1.1 (2006-12) "Multimedia Broadcast/Multicast Service (MBMS); Architecture and Functional Description" (Release 7), incorporated by reference herein in its entirety. The MBMS typically involves a selection of unidirectional point-to-multipoint and bi-directional point-to-point transmissions of multimedia data such as text, audio, picture, video from a single source entity to a number of users in a service area. The MBMS aims at provisioning multiple instances of a point-to-point service with a single transmission over the radio interface as a radio multicast.

In the MBMS, there are two different modes of operation: Multicast mode, which comprises the following main phases of subscription: subscription, service announcement, joining, session start, MBMS notification, data transfer, session stop and leaving. Subscription establishes a relationship between the user and the service provider to allow the user to receive the related MBMS service. The service announcement subsequently informs users about the available MBMS user services. On joining, a subscriber indicates to the network that he or she desires to receive multicast mode data of a particular MBMS bearer service. Next, the session start triggers for bearer resource establishment for MBMS data transfer and after that the MBMS notification informs the user of available MBMS multicast data transfer, which then occurs in the data transfer phase. Finally, when no more data has been sent for a set period, the session stops and the bearer resources are released. The subscriber may leave or deactivate the MBMS multicast service when no more multicast mode service is desired. Either the user, the service provider or both may be charged for the multicast mode service. In the broadcast mode, in comparison to the multicast mode, the operation is otherwise similar but the joining and leaving are not needed. Correspondingly, the broadcast service is likely to be charged from the service provider only.

A typical 3GPP radio access system UTRAN (UMTS Terrestrial Radio Access Network) for implementing the MBMS has a basic architecture as is illustrated in FIG. 1. FIG. 1 depicts a plurality of user equipment (UE) 11 that is mobile stations, within a predetermined service area 12 such as a cell, a plurality of radio network controllers (RNC) 13, two Serving GPRS support nodes (SGSN) 14, two Gateway GPRS support nodes (GGSN) 15, a Broadcast-Multicast Service centre (BM-SC) 16, an operation and maintenance (O&M) workstation or server 18, a charging gateway (CG) 19 and a content provider or Multicast Broadcast source 20.

On delivering MBMS transmissions to numerous mobile stations 11, only one packet data protocol (PDP) context is established as a prerequisite for a packet data transmission connection 17 between a GGSN 15 and a mobile station 11 via an SGSN 14. A single, common context suffices for transmission of data within a core network thanks to the point-to-multipoint approach.

In case of normal packet data transmission (non-MBMS) between the core network 21 (SGSN 14 in practice) and Radio Access Network (RAN), or in practice RNC 13, it is possible to obtain reports from the RNC 13 in question for statistical use. Namely, a so-called volume report query as shown by signal 210 in FIG. 2 can be sent from the SGSN and responsive data volume report 220 be received for given Radio Access Bearer (RAB) or RABs as described in 3GPP TS 25.413 v.7.4.0, chapter 8.21. The data volume reports include the amount of unsuccessfully transmitted downlink data since the last data volume reported for each RAB addressed in the query. The data volume reports provide a useful technique to detect problems on particular RABs, for instance. A telecommunications network operator typically is able to inspect the state of the network using a so-called operations and maintenance service such as Nokia NetAct©. FIG. 1 further discloses a maintenance terminal 18 configured to provide the operations and maintenance service.

In case of MBMS, instead of using potentially hundreds or even thousands of RABs, there is provided a single MBMS RAB associated with a single PDP context. Hence, it is not possible to use the data volume reporting, because that procedure is directed to a model in which an individual bearer has been assigned to each mobile station 11. A standard 3GPP TS 32.200 defines charging principles in the UMTS. Charging is generally implemented in the UMTS by sending particular charging data records (CDR) to the charging gateway 19. This standard bluntly bans the use of data volume reporting in its most recent version 5.9.0, in section 6.1.4 "Volume counting in RNC". The standard defines that "To avoid inaccurate charging at the 3G-SGSN, the 3G-SGSN will always instruct the RNC at RAB set-up to count the unsent downlink data towards the MS." The standard continues that "The reporting of unsent data by the RNC to the 3G-SGSN will only occur at RAB release. This occurs at either the termination of the PDP context or handover. The 3G-SGSN shall not use the optional 'Data Volume Request' message to RNC in any situation, as this shall cause a significant performance impact to both the RNC and 3G-SGSN.". Finally, the chapter ends to "When 3G-SGSN receives a report of unsent data volume from the RNC at RAB release. The 3G-SGSN shall report this value to the 'RNC Unsent Downlink Volume' field in the S-CDR."

It can be said that there is a strong prejudice in the standard against the use of the data volume report routine or 3GPP TS 25.413 chapter 8.21.

In case of MBMS, whilst there exists a certain acknowledgment for the successful establishment of the PDP context, there is no way of verifying how much of all the data originated from the BM-SC fail to reach the UE before the RAB used in the MBMS service is released. In case of MBMS, it is also the service provider that pays for the service. As suitable for continuous providing of MBMS service (e.g. advertising), it is yet possible that the service may be provided for substantial periods of time and conversely the MBMS RAB release may happen hours or even days after an error has occurred. Fortunately, it may not be very common to have errors such as overflow of buffers at the RNC or related base stations, but when the errors occur, understandably the errors may not be detected before users start to call to customer helpdesk and complain for a defect in the MBMS service. Hence, it may happen that MBMS service providers are overcharged for MBMS messages intended to be broadcast from a BM-SC but which are yet unavailable the users and that the delivery of MBMS messages also fails over a substantial period of time causing even worse inconvenience and economical damage.

It is an object of the invention to avoid or at least to mitigate problems associated with the state of the art.

SUMMARY OF THE INVENTION

According to a first aspect of the invention there is provided a method comprising:

setting up a multimedia broadcast multicast service group including defining a parameter associated with the service group;

sending from a support node to a radio access network data related to the service group and a data volume query including the parameter associated with the service group; and receiving by the support node a data volume report related to the multimedia broadcast multicast service group responsive to the data volume query.

Advantageously, the parameter may be a temporary mobile group identity. Alternatively, the parameter may be an IP address or a derivative thereof.

The data volume report may be configured to report: the amount of data the use of which has failed in the radio access network; the amount of data the reception of which has failed in the radio access network; the amount of data the use of which has succeeded in the radio access network; and the amount of data the reception of which has succeeded in the radio access network.

By providing data volume queries with parameters associated with multimedia broadcast service groups it is possible for a support node to obtain a data volume report from the radio access network.

The radio access network may be a UMTS Terrestrial Radio Access Network (UTRAN). In particular, the data volume query may be sent to a radio network controller.

The sending of the data volume query may be triggered by a predetermined event. The predetermined event may be selected from a group consisting of: lapsing of a set time; a result of monitoring usage of services advertised in the service group; and appearance of an error report concerning equipment also used for providing the multimedia broadcast multicast service.

Advantageously, by providing data volume reporting for use in conjunction with the MBMS, the amount of undelivered data may be sent in an MBMS charging data record from an SGSN to a charging network element.

According to a second aspect of the invention there is provided a support node, comprising:

a processor configured to set up a multimedia broadcast multicast service group including defining a parameter associated with the service group;

an output configured to send to a radio access network data related to the service group and a data volume query including the parameter associated with the service group; and an input configured to receive a data volume report related to the multimedia broadcast multicast service group responsive to the data volume query.

According to a third aspect of the invention there is provided in a radio network controller a method comprising:

receiving a parameter associated with a multimedia broadcast multicast service group;

setting up the multimedia broadcast multicast service group based on the parameter associated with the service group;

receiving from a support node a data volume query including the parameter associated with the service group; and sending to the support node a data volume report related to the multimedia broadcast multicast service group responsive to the data volume query.

According to a fourth aspect of the invention there is provided a radio network controller comprising:

an input configured to receive a parameter associated with a multimedia broadcast multicast service group;

a processor configured to set up the multimedia broadcast multicast service group based on the parameter associated with the service group;

the input being further configured to receive from a support node a data volume query including the parameter associated with the service group; and an output configured to send to the support node a data volume report related to the multimedia broadcast multicast service group responsive to the data volume query.

According to a fifth aspect of the invention there is provided a memory medium comprising a computer program configured to cause a support node to perform the method of the first aspect.

According to a sixth aspect of the invention there is provided a memory medium comprising a computer program configured to cause a radio network controller to perform the method of the third aspect.

According to a seventh aspect of the invention there is provided a support node according to claim 25.

According to an eighth aspect of the invention there is provided a radio network controller according to claim 26.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of non-restrictive examples only, with reference to the accompanying drawings, in which.

DETAILED DESCRIPTION OF THE INVENTION

Figure 1:
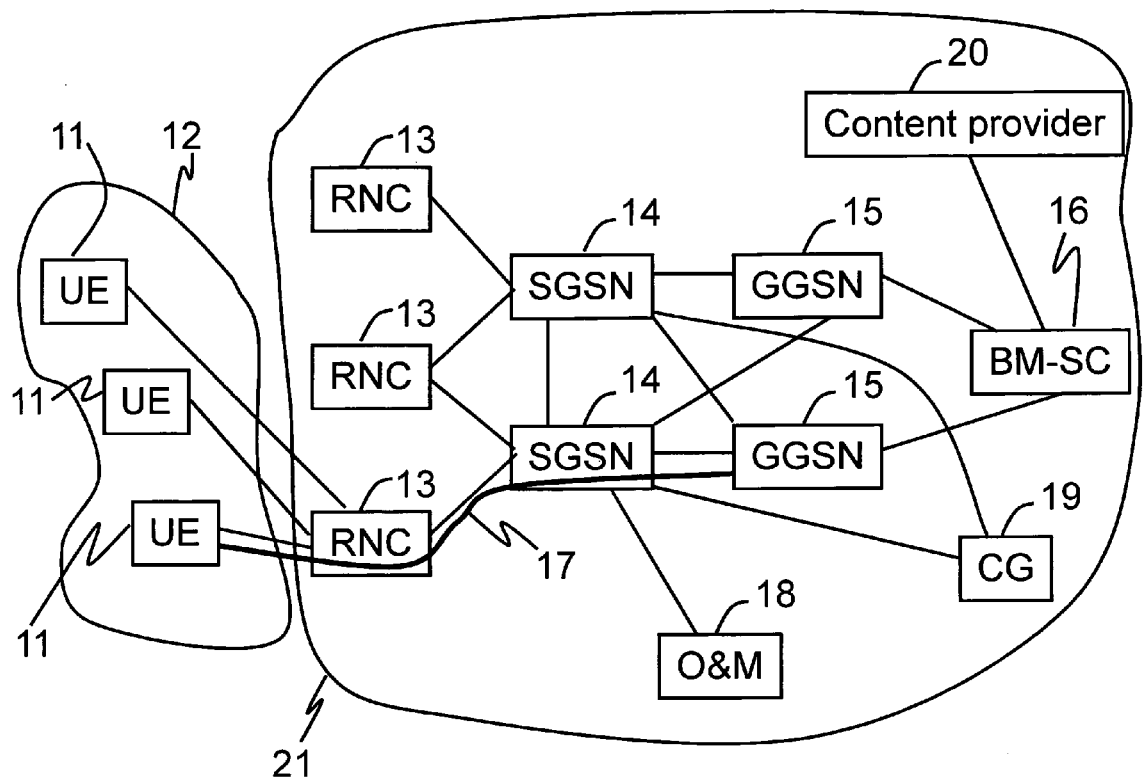
FIG. 1 shows a schematic picture of a network architecture representing the basic network elements related to the environment of an embodiment of the invention.
Figure 2:
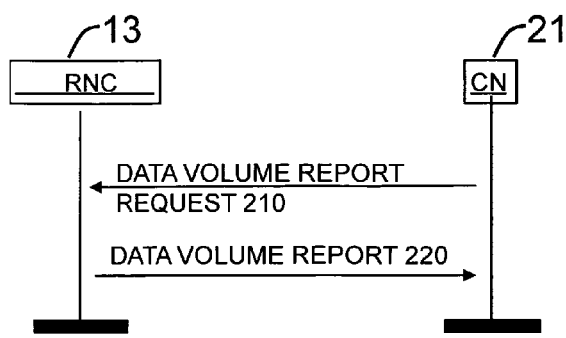
FIG. 2 shows a signalling diagram illustrative of successful operation in volume reporting routine.

FIGS. 1 and 2 have been explained in the foregoing. It should be understood that while the basic architecture of FIG. 1 and the exchange of messages as in FIG. 2 may be common with prior art, the implementation and respective operation of particular entities as well as the content of particular messages differ from that in the prior art.

FIG. 1 presents different servers: radio network controller (RNC) 13, serving GPRS support node (SGSN) 14, Gateway GPRS support node (GGSN) 15, Broadcast-Multicast Service centre (BM-SC) 16 and charging gateway (CG) 19. These servers are typically implemented by using normal server computers suitably dimensioned for the load they are subjected to. It is a matter of implementation whether some of the servers are distributed, combined, or even virtualized and possibly operated as part of a server farm. The operation and maintenance (O&M) terminal 18 may be a dummy terminal connected to respective functional server typically residing at the SGSN 14. Alternatively, the O&M block 18 may be or comprise a server for O&M purpose. The O&M block 18 may even be remotely accessible.

Figure 3:
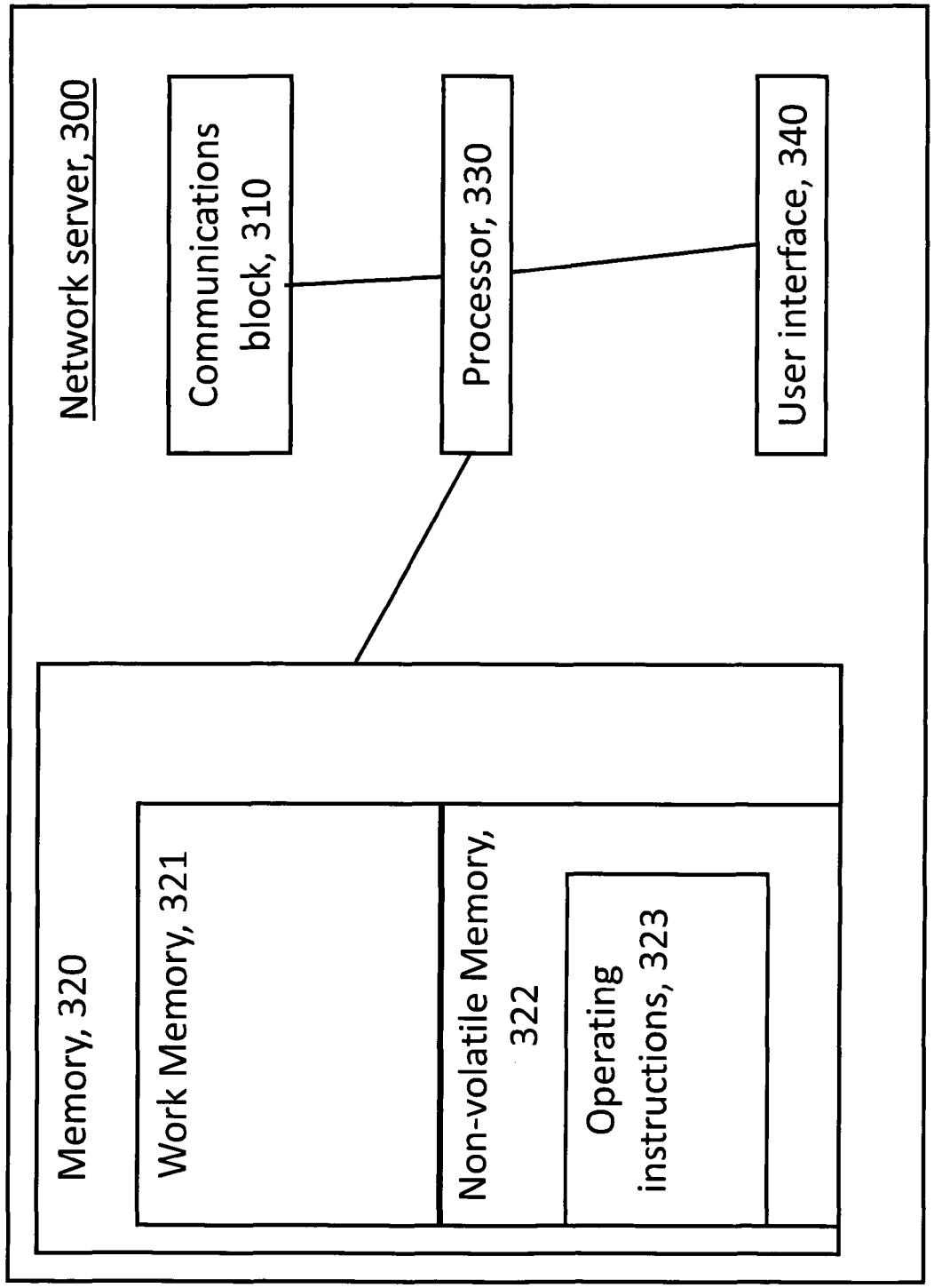
FIG. 3 shows a block diagram of a network server suitable for operating as a server in an embodiment of the invention.

FIG. 3 shows a block diagram of a network server 300 suitable for operating as a server in an embodiment of the invention. The network server 300 comprises a communications block 310, a memory 320 including a work memory 321 and a non-volatile memory 322 that comprises operating instructions 323. The network server 300 further comprises a processor 330 for executing the operating instructions 323 and accordingly controlling other blocks of the network server 300, and a user interface 340 for providing output to a user and reading user input. The processor is typically a master control unit (MCU). Alternatively, the processor may be a microprocessor, a digital signal processor, an application specific integrated circuit, a field programmable gate array, a microcontroller or a combination of such elements. The processor may also comprise two or more elements configured to operate in parallel (e.g. multicore or multiprocessor implementation).

Figure 4:
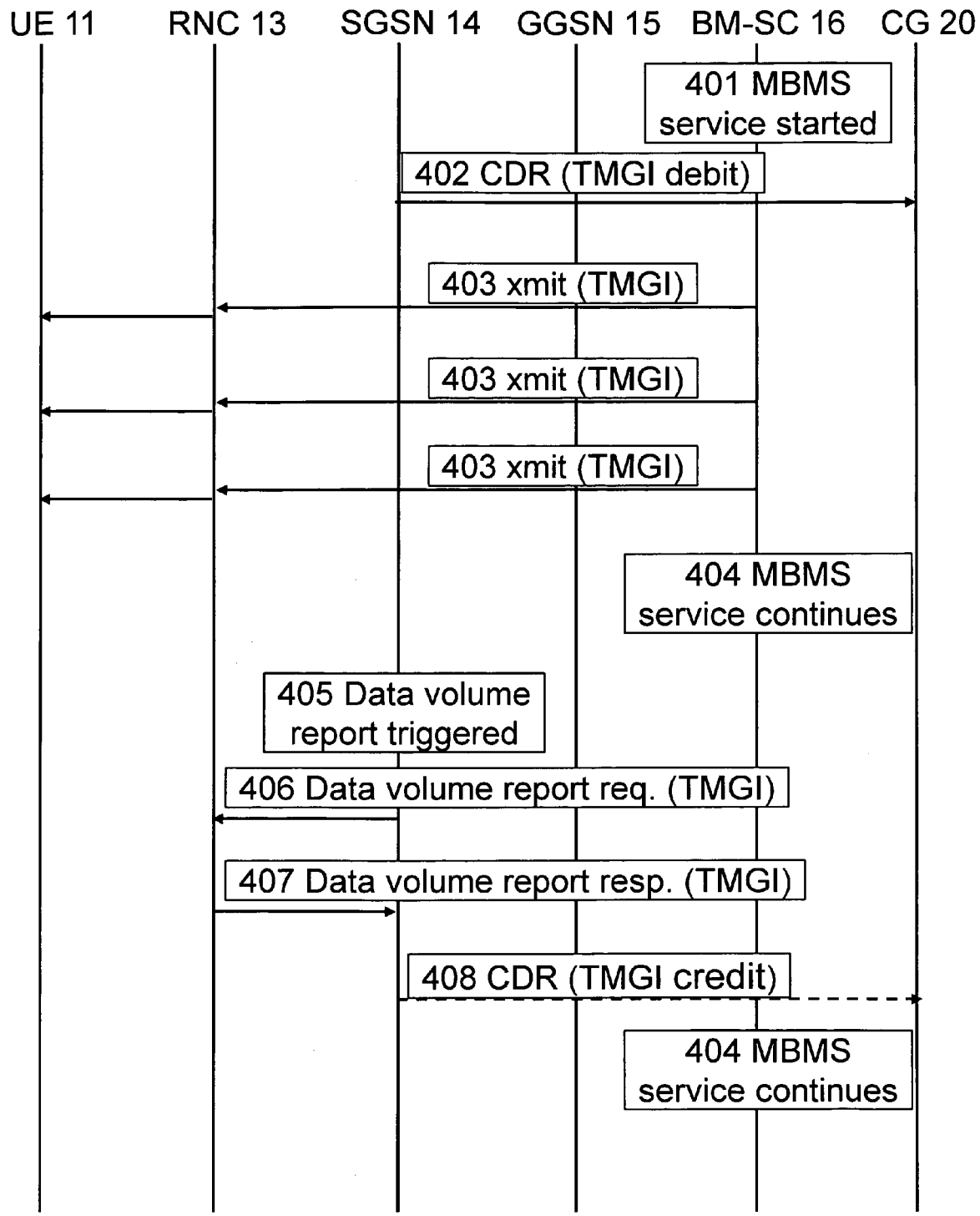
FIG. 4 shows a signalling chart illustrative of the different messages and events occurring according an embodiment of the invention.

FIG. 4 shows a signalling chart illustrative of the different messages and events occurring according an embodiment of the invention. FIG. 4 starts from a situation wherein the MBMS service is already started 401, associated with a given temporary mobile group identity (TMGI). Ordinary charging data records (CDR) are sent 402 to the charging gateway 20 as usual for charging purpose, normally designating the corresponding service by any unique reference such as the TMGI and an optional timestamp. One or more transmissions are sent 403 from the BM-SC 16 via the RNC 13 to the one or typically numerous UE 11 and the MBMS service continues 404 to be provided with the given TMGI. At some point of time during the providing of the MBMS service, a data volume report is triggered 405. In FIG. 4 this event is drawn at the SGSN; however, the event may be first determined elsewhere, but the SGSN 14 be instructed to obtain a data volume report for the MBMS service in question. Instead of using the standardized data volume report request set forth in 3GPP TS 25.413 chapter 8.21, a modified data volume request 406 is sent from the SGSN 14 to the RNC 13. In the modified data volume request 406 the TMGI or another corresponding parameter such as internet protocol address is used to identify the RAB used in the MBMS service in question. Correspondingly, the RNC 13 responds with a modified data volume report 407 that identifies the RAB by its MBMS related identifier.

The triggering event 405 is in an embodiment of the invention any one or more of the following: detecting a request from a telecommunications network operator; detecting a request from an MBMS service provider; detecting a proportion or an amount of unsent data packets that meets a set threshold in other data transmission via common RNC or base station; and detecting that links contained in the transmissions 403 have been followed by the UE 11 to an extent less than a predetermined value. Hence, the triggering event may be automatically detected an event or a manually detected event, such as requesting data volume reporting responsive to help desk phone call complaints for lacking or defective MBMS service.

In an embodiment of the invention, a CDR designating the MBMS service in question is sent 408 to the CG 20 indicative of the amount of unsent data volume. The CG 20 may be configured to provide a refund or reduction in charging corresponding to the volume of data the sending of which has failed.

Following—and during the data volume reporting routine—the providing of the MBMS service continues 404 as normally if there is still data to be sent.

It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

I claim:

1. A method comprising:
setting up a multimedia broadcast/multicast service group including defining a parameter associated with the service group;
sending from a support node to a radio access network data related to the service group and a data volume query including the parameter associated with the service group, in which the data volume query is sent before all of the data related to the service group is sent, wherein the sending of the data volume query is triggered by detecting that links contained in transmissions corresponding to a user equipment in the service group have been followed by the user equipment to an extent less than a predetermined value; and
receiving by the support node a data volume report related to the multimedia broadcast/multicast service group responsive to the data volume query.

2. A method according to claim 1, wherein the parameter is selected from a group consisting of: a temporary mobile group identity; an IP address related to the multimedia broadcast/multicast service group; and a derivative from an IP address related to the multimedia broadcast/multicast service group.

3. A method according claim 1, wherein the data volume report is configured to report one of: the amount of data the use of which has failed in the radio access network; the amount of data the reception of which has failed in the radio access network; the amount of data the use of which has succeeded in the radio access network; and the amount of data the reception of which has succeeded in the radio access network.

4. A method according to claim 1, wherein the radio access network is a Universal Mobile Telecommunications System terrestrial radio access network.

5. A method according to claim 1, wherein the data volume query is sent to a radio network controller.

6. An apparatus, comprising:
at least one processor;
at least one memory medium storing computer executable instructions;

in which the at least one memory and the computer executable instructions is configured with the at least one processor to cause the apparatus at least to:

set up a multimedia broadcast/multicast service group including defining a parameter associated with the service group;

send to a radio access network data related to the service group and a data volume query including the parameter associated with the service group, in which the data volume query is sent before all of the data related to the service group is sent, wherein the data volume query is sent in response to being triggered by detecting that links contained in transmissions corresponding to a user equipment in the service group have been followed by the user equipment to an extent less than a predetermined value; and receive a data volume report related to the multimedia broadcast/multicast service group responsive to the data volume query.

7. An apparatus according to claim 6, wherein the parameter is selected from a group consisting of: a temporary mobile group identity; an IP address related to the multimedia broadcast/multicast service group; and a derivative from an IP address related to the multimedia broadcast/multicast service group.

8. An apparatus according to claim 6, wherein the data volume report comprises information about at least one of: the amount of data the use of which has failed in the radio access network; the amount of data the reception of which has failed in the radio access network; the amount of data the use of which has succeeded in the radio access network; and the amount of data the reception of which has succeeded in the radio access network.

9. An apparatus according to claim 6, wherein the radio access network is a Universal Mobile Telecommunications System terrestrial radio access network.

10. An apparatus according to any claim 6, wherein the at least one memory and the computer executable instructions is configured with the at least one processor to cause the apparatus to send the data volume query to a radio network controller.

11. A non-transitory memory comprising a computer program configured to control a support node, comprising:

computer executable program code for enabling the support node to set up a multimedia broadcast/multicast service group including defining a parameter associated with the service group;

computer executable program code for enabling the support node to send to a radio access network data related to the service group and a data volume query including the parameter associated with the service group, in which the data volume query is sent before all of the data related to the service group is sent, wherein the data volume query is sent in response to being triggered by detecting that links contained in transmissions corresponding to a user equipment in the service group have been followed by the user equipment to an extent less than a predetermined value; and computer executable program code for enabling the support node to receive by the support node a data volume report related to the multimedia broadcast/multicast service group responsive to the data volume query.

12. A support node, comprising:

means for setting up a multimedia broadcast/multicast service group including defining a parameter associated with the service group;

means for sending to a radio access network data related to the service group and a data volume query including the parameter associated with the service group, in which the data volume query is sent before all of the data related to the service group is sent, wherein the means for sending of the data volume query is triggered by detecting that links contained in transmissions corresponding to a user equipment in the service group have been followed by the user equipment to an extent less than a predetermined value; and means for receiving a data volume report related to the multimedia broadcast/multicast service group responsive to the data volume query.

13. The support node of claim 12, in which:

the means for setting up the multimedia broadcast/multicast service group comprises at least one processor;

the means for sending comprises a communications block; and the means for receiving comprises the communications block.

* * * * *

UNITED STATES PATENT AND TRADEMARK OFFICE
CERTIFICATE OF CORRECTION

| | | |
|---|---|---|
| PATENT NO. | : 8,412,153 B2 | Page 1 of 1 |
| APPLICATION NO. | : 11/656644 | |
| DATED | : April 2, 2013 | |
| INVENTOR(S) | : Kauranen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this
Second Day of December, 2014

Michelle K. Lee
*Deputy Director of the United States Patent and Trademark Office*